United States Patent [19]
Gonzalez

[11] Patent Number: 5,751,077
[45] Date of Patent: May 12, 1998

[54] FLUID-COOLED LINEAR MOTOR ARMATURE

[75] Inventor: Cesar Gonzalez, Troy, Mich.

[73] Assignee: Ford Global Technologies, Inc., Dearborn, Mich.

[21] Appl. No.: 827,131

[22] Filed: Mar. 27, 1997

[51] Int. Cl.⁶ ............................................. H02K 41/00
[52] U.S. Cl. ........................................ 310/12; 310/58
[58] Field of Search ............................ 310/12, 13, 14, 310/54, 57, 58, 64

[56] References Cited

U.S. PATENT DOCUMENTS

| | | | |
|---|---|---|---|
| 3,668,444 | 6/1972 | Davey | 310/13 |
| 3,835,339 | 9/1974 | Laronze | 310/13 |
| 4,445,056 | 4/1984 | Gaylord | 310/54 |
| 4,749,921 | 6/1988 | Chitayat | 318/135 |
| 4,839,545 | 6/1989 | Chitayat | 310/12 |
| 4,985,651 | 1/1991 | Chitayat | 310/12 |
| 5,179,304 | 1/1993 | Kenjo et al. | 310/12 |
| 5,703,418 | 12/1997 | Assa | 310/12 |

FOREIGN PATENT DOCUMENTS 197809  9/1978  Germany.

Primary Examiner—Steven L. Stephan
Assistant Examiner—Judson H. Jones
Attorney, Agent, or Firm—Mark S. Sparschu; Roger L. May

[57] ABSTRACT

A linear motor armature includes a sealed metal case having a central chamber formed therein. A lamination stack is disposed within the central chamber and includes a coil assembly disposed within the lamination stack. The central chamber is flooded with an electrically nonconductive fluid, such as oil, for cooling the coil. The cooling oil is flowed in opposing directions to facilitate bidirectional cooling of the coil.

12 Claims, 4 Drawing Sheets

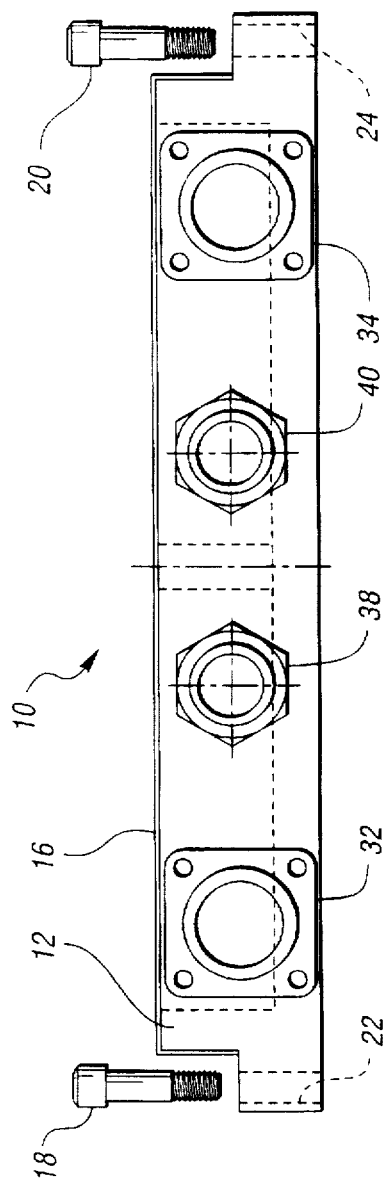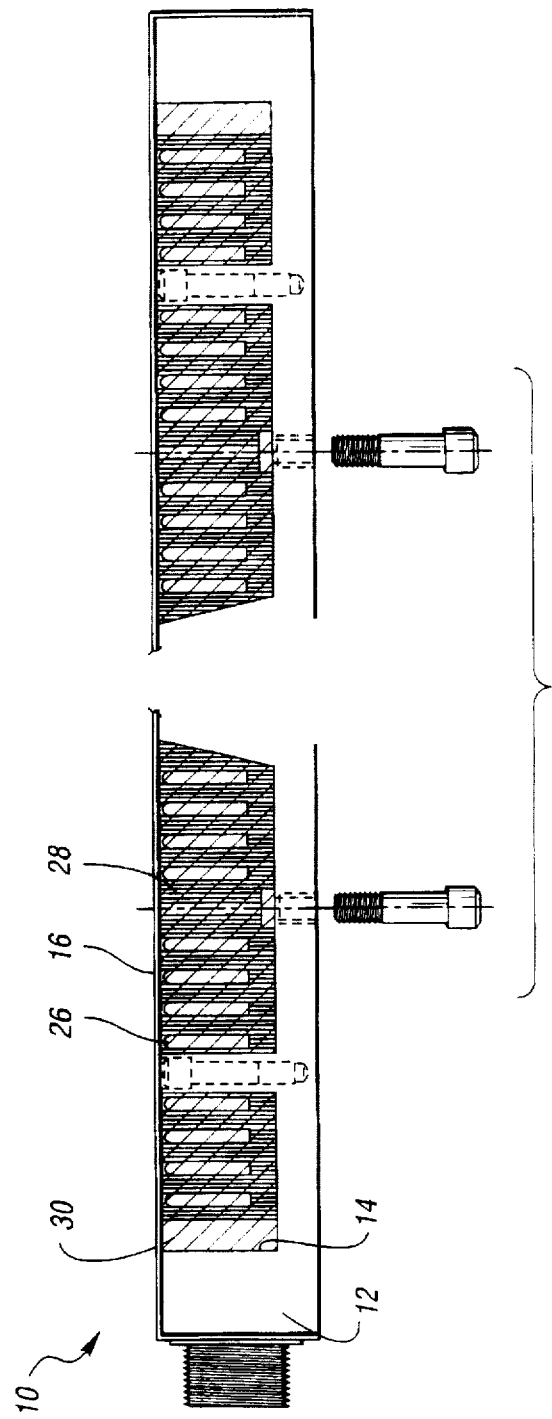

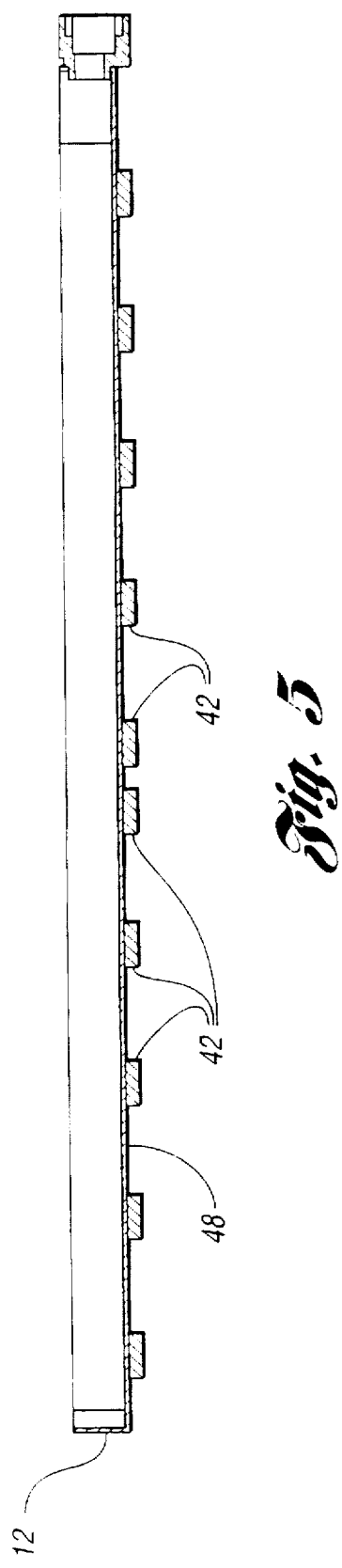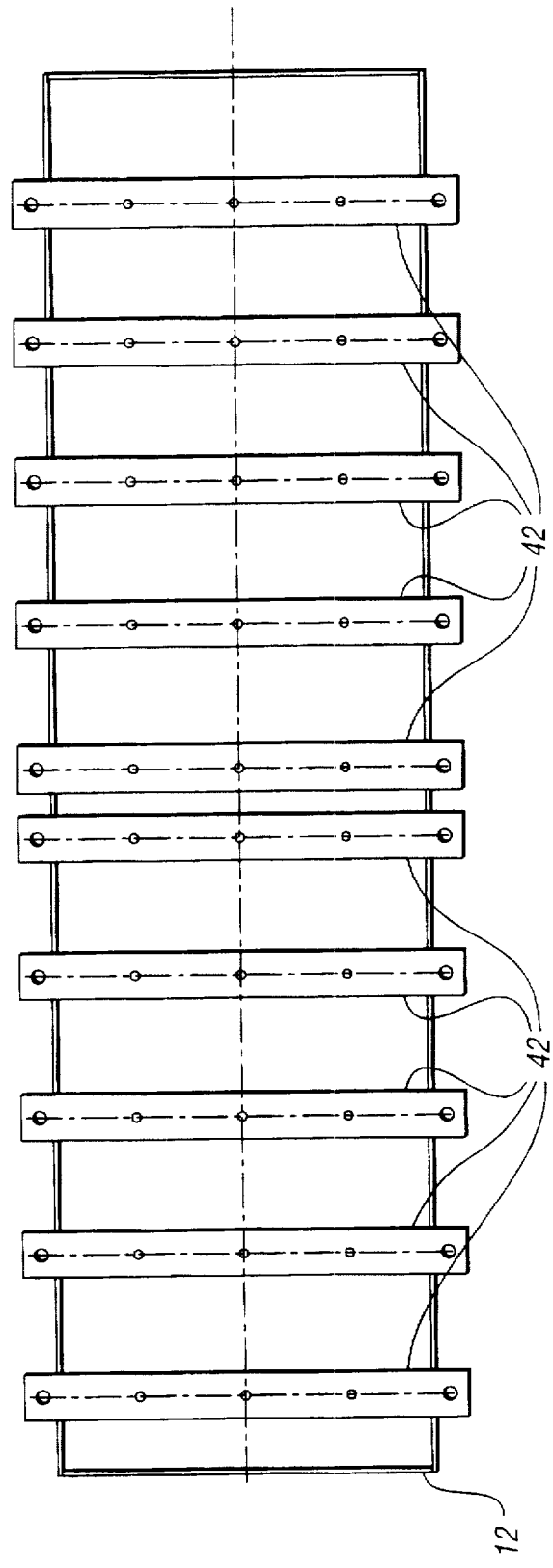

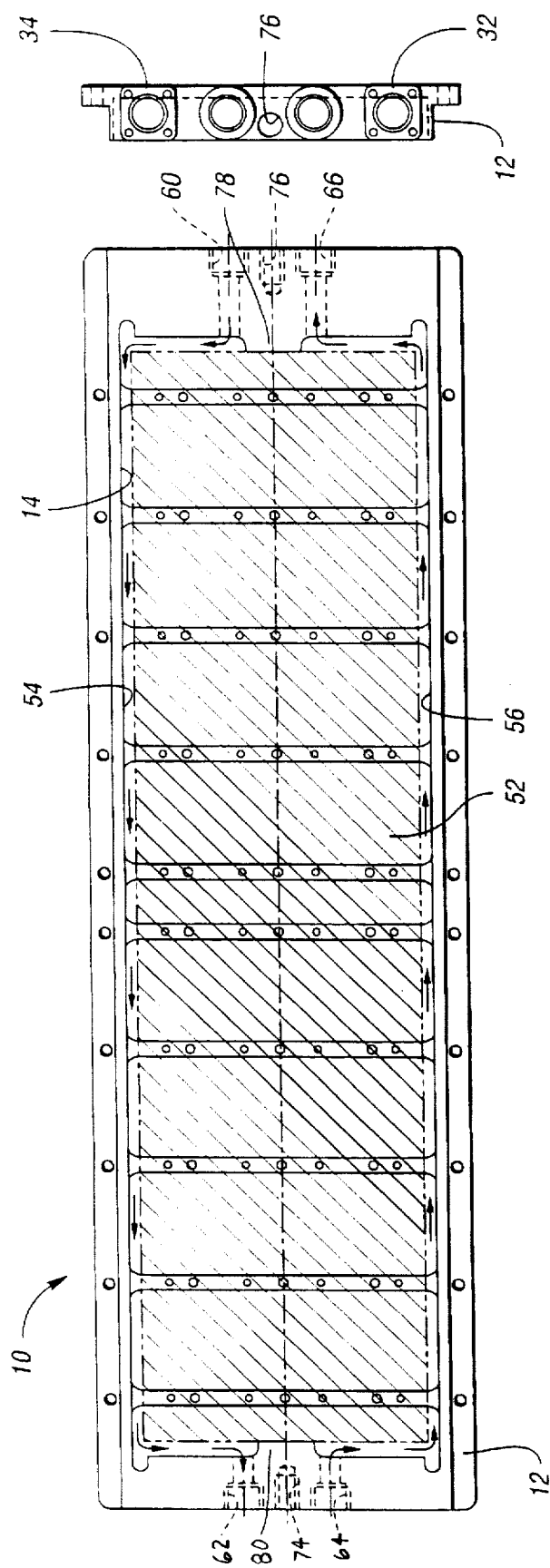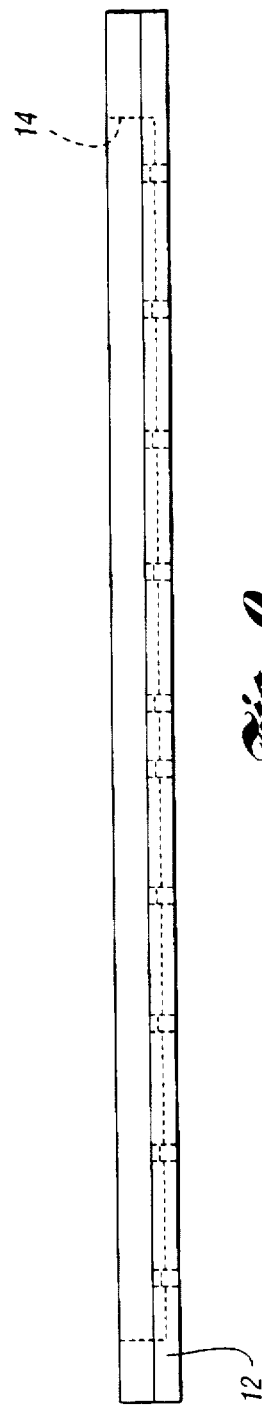

FLUID-COOLED LINEAR MOTOR ARMATURE

TECHNICAL FIELD

The present invention relates to linear motors and, more specifically, to a fully enclosed linear motor armature in which the armature is flooded with an electrically nonconductive fluid, such as oil, for cooling.

BACKGROUND OF THE INVENTION

Many manufacturing applications require the generation of a linear force for movement of machining equipment. Conventional A/C and D/C motors produce a rotary torque about an axis which must be converted into a linear force before it can be used in such applications. Such conversion is accomplished by a screw and nut, a sheave and cable, or a rack and pinion, among other designs. These designs are problematic in that they tend to wear out relatively quickly, and they are incapable of producing high linear speeds.

Linear motors are also known which directly produce a linear force in response to an electric input. Typically, a linear motor takes advantage of the variable magnetic reluctance produced in the vicinity of slots in a pole face of a magnetic member. An armature of a magnetic material, having windings therein, is urged to step from position to position along the pole face as defined by the slots or, alternatively, the magnetic member is movable while the armature is stationary.

In such designs, the armature portion usually comprises a coil disposed within a lamination stack, and surrounded by an epoxy block. A cooling tube is typically provided adjacent the epoxy block for drawing heat from the armature.

The force which such linear motors are capable of producing is limited by resistive heating in the windings of the armature of the motor. The normally used copper cooling tube requires mechanical retention within the epoxy case, and provides somewhat limited armature cooling capacity because the epoxy itself acts as an insulator for the coil assembly. By reducing heat dissipation, performance of the linear motor is adversely affected, and the forward thrust capability declines. Accordingly, it is desirable to provide an improved armature design with increased cooling capacity.

Another problem with such designs is that the epoxy molding may create difficulty in manufacturing the armature. The epoxy is typically molded around the coil and laminate stack within a separate mold. It is then removed from the mold and trimmed, and the mold is cleaned out for the next molding operation. These steps require handling which adds manufacturing cost. Additionally, the wire harness typically gets wet and is subject to damage during epoxy molding and grinding of the epoxy block.

Another shortcoming of prior art designs is that wire harnesses extending from the epoxy block are typically unprotected and exposed to damage or moisture during operation of the linear motor. Wire harness damage may result in substantial down time for the equipment.

A further shortcoming of prior art designs is that such designs are typically limited to a single pass cooling arrangement wherein a cooling fluid travels from one end of the armature to another. In this configuration, the cooling fluid may be substantially heated by the time it reaches the opposing end of the armature, and therefore uneven cooling occurs.

DISCLOSURE OF THE INVENTION

The present invention overcomes the above-referenced shortcomings of prior art linear motors by providing a linear motor with an armature which is fully enclosed within a sealed metal case, and an electronically nonconductive fluid is circulated within the case in direct contact with the lamination stack for cooling the lamination stack and coil assembly. By eliminating the prior art epoxy block, cooling efficiency is greatly enhanced, which improves linear thrust capability of the motor. Also, the wiring harnesses are connected to the armature within moisture-sealed mechanical fittings. In this configuration, the sealed metal case, in conjunction with the mechanical fittings, prevents moisture from contacting the coils and shorting out the motor.

More specifically, the present invention provides a linear motor armature including a sealed metal case having a central chamber formed therein. A lamination stack is disposed within the central chamber, and at least one coil is disposed within the lamination stack. The central chamber is flooded with an electrically nonconductive fluid for directly cooling the lamination stack and coil.

Another aspect of the invention provides a method of manufacturing a linear motor armature, comprising: 1) providing a sealable metal case with a central chamber formed therein; 2) installing at least one coil and lamination stack within the central chamber; 3) sealing the central chamber; and 4) providing a source of electrically nonconductive fluid in communication with the central chamber for cooling the lamination stack and coil assembly. In a preferred embodiment, the method further comprises flowing cooling oil through the central chamber in opposing directions to facilitate bidirectional cooling.

Accordingly, an object of the present invention is to provide an improved linear motor armature in which heat dissipation is enhanced for improved performance by cooling the coil and lamination stack directly by flowing an electrically nonconductive fluid across the lamination stack.

The above object and other objects, features, and advantages of the present invention are readily apparent from the following detailed description of the best mode for carrying out the invention when taken in connection with the accompanying drawings.

BRIEF DESCRIPTION OF THE DRAWINGS

FIG. 1 shows a schematically arranged partially exploded sectional view of a linear motor armature in accordance with the present invention;

FIG. 2 shows a longitudinal cross-section of the armature shown in FIG. 1;

FIG. 5 shows a side view of the motor case assembly of FIG. 3;

FIG. 6 shows a bottom view of the motor case assembly of FIG. 3;

FIG. 7 shows a plan view of an armature in accordance with the present invention;

FIG. 8 shows an end view of the armature of FIG. 7; and

FIG. 9 shows a side view of the armature of FIG. 7.

DETAILED DESCRIPTION OF THE PREFERRED EMBODIMENT

Figure 3:
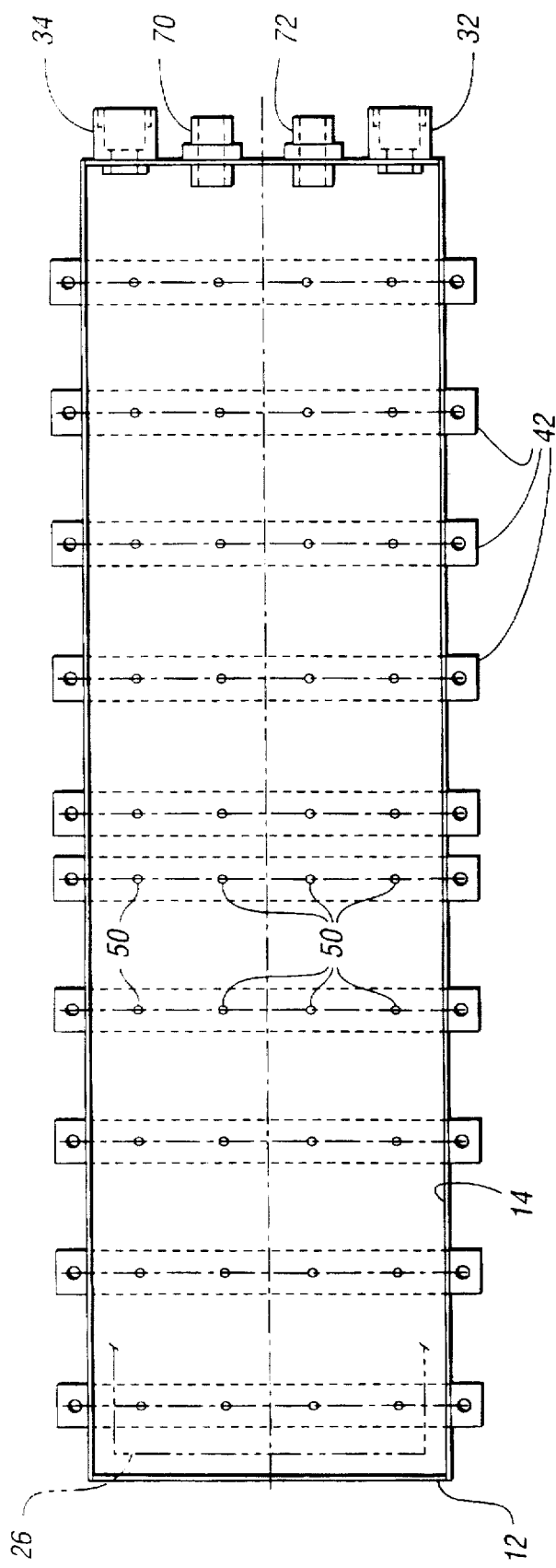
FIG. 3 shows a plan view of a motor case assembly in accordance with the present invention.
Figure 4:
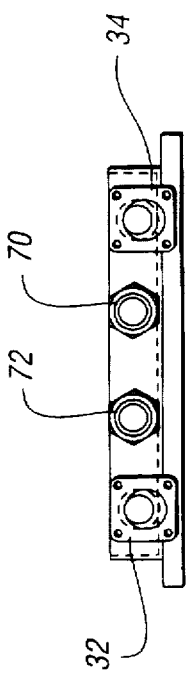
FIG. 4 shows an end view of the motor case assembly of FIG. 3.

Referring to FIGS. 1 and 2, a linear motor armature 10 is shown in accordance with the present invention. The linear motor armature 10 comprises a sealed metal case 12, which is preferably aluminum or steel, having a central chamber 14 formed therein. The central chamber 14 is sealed by means of a cover 16, which is attached to the case 12 by the bolts 18,20, which extend, respectively, through the apertures 22,24. The cover 16 may also be adhesively bonded or welded to the case 12. Within the central chamber 14 is disposed the coil assembly 26, which is disposed within a lamination stack 28.

In order to provide current to the coil assembly 26 via a wiring harness, mechanical fittings 32,34 are provided. These mechanical fittings 32,34 facilitate moisture-protected attachment of wiring harnesses to the coil assembly 26.

An electrically nonconductive fluid, such as ethylene glycol or cooling oil 30, is circulated around the lamination stack 28 and coil assembly 26 within the central chamber 14 for cooling the coil assembly 26. The cooling oil 30 enters and exits the central chamber 14 via the cooling oil ports 38,40.

The case 12 is more clearly illustrated in FIGS. 3–6. As shown, the case 12 includes a central chamber 14 for housing the coil assembly 26 and lamination stack 28. The case 12 further includes a plurality of risers or feet 42. The feet 42 are welded to the bottom portion 48 of the case 12, and the respective coils 26 are secured to the case 12 by means of the attachment mounting holes 50.

As shown in FIG. 7, the central chamber 14 cooperates with the coil assembly 52 (i.e. the coil assembly 26 and lamination stack 28) to form first and second cooling channels 54,56 about the periphery of the coil assembly 52 for drawing heat from the coil assembly 52. As shown in FIGS. 3 and 7, the first flow channel 54 travels from the inlet port 60 along the channel 54 to the outlet port 62. The second flow channel 56 carries cooling oil from the inlet port 64 to the outlet port 66. In this manner, bidirectional cooling flow is accomplished, which provides even cooling across the length of the armature. As shown in FIG. 3, fittings 70,72 are provided, for example, in communication with the inlet port 60 and outlet port 66 shown in FIG. 7.

As further shown in FIG. 7, eyebolt holes 74,76 are provided for handling of the armature 10.

In the above-described configuration, flow restriction portions 78,80 of the case 12 are operative to separate the flow of the cooling oil in opposing directions to facilitate the bidirectional flow. If one of these portions 78,80 were removed, the flow channels 54,56 could be connected to act as a single channel wherein the oil flow enters and exits at the same end of the armature 10.

The present invention enhances heat dissipation by cooling the coil assembly 52 directly by flooding the flow channels 54,56 with oil. This design alleviates the heat dissipation problems and other disadvantages of the epoxy block used in prior art designs. Furthermore, the mechanical fittings 32,34 facilitate moisture-free attachment of electrical connectors to the coil assembly. Additionally, by sealing the metal case with the central chamber cover 16, entry of moisture into the armature 10 is prevented, thereby preventing shorting out of the coil.

The present invention also provides a method of manufacturing a linear armature, comprising: 1) providing a sealable metal case with a central chamber formed therein; 2) installing at least one coil and lamination stack within the central chamber; 3) sealing the central chamber; and 4) providing a source of electrically nonconductive fluid in communication with the central chamber for cooling the coil. In a preferred embodiment, the method further comprises flowing cooling oil in opposing directions to facilitate bidirectional cooling. The method may further comprise providing at least two moisture-sealed mechanical fittings on the metal case for sealed attachment of electrical connectors to the coil.

By providing heat dissipation by means of cooling oil directly at the coil assembly 52, and by providing bidirectional cooling, enhanced performance is achieved because heat dissipation is increased.

While the best mode for carrying out the invention has been described in detail, those familiar with the art to which this invention relates will recognize various alternative designs and embodiments for practicing the invention within the scope of the appended claims.

What is claimed is:

1. A linear motor armature, comprising:

a sealed metal case having a central chamber formed therein;

a lamination stack disposed within the central chamber; and a coil assembly disposed within the lamination stack;

wherein the central chamber is flooded with an electrically nonconductive fluid for directly cooling said lamination stack and coil assembly.

2. The linear motor armature of claim 1, further comprising at least two moisture-sealed mechanical fittings extending from the sealed metal case for attachment of electrical connectors to said coil assembly.

3. The linear motor armature of claim 1, wherein said sealed metal case further comprises a central chamber cover disposed over the central chamber.

4. The linear motor armature of claim 1, wherein said sealed metal case comprises cast aluminum.

5. The linear motor armature of claim 1, further comprising a flow restriction member for directing fluid flow through said central chamber.

6. The linear motor armature of claim 1, wherein said electrically nonconductive fluid comprises oil.

7. A method of manufacturing a linear motor armature, comprising:

providing a sealable metal case with a central chamber formed therein;

installing a coil assembly and lamination stack within the central chamber;

sealing the central chamber; and providing a source of electrically nonconductive fluid in communication with the central chamber for directly cooling said lamination stack and coil assembly.

8. The method of claim 7, further comprising providing at least two moisture-sealed mechanical fittings on the metal case for sealed attachment of electrical connectors to said coil assembly.

9. A linear motor armature, comprising:

a sealed metal case having a central chamber formed therein;

a lamination stack disposed within the central chamber;

a coil assembly disposed within the lamination stack;

a source of electrically nonconductive fluid in fluid communication with said central chamber for directly cooling said coil assembly; and at least two moisture-sealed mechanical fittings extending from the sealed metal case for sealed and protected attachment of electrical connectors to said coil assembly, wherein said armature is configured to receive externally introduced electrically nonconductive fluid in opposing ends of the armature and to direct the electrically nonconductive fluid in opposing directions across the lamination stack within the central chamber.

10. The linear motor armature of claim 9, wherein said sealed metal case further comprises a central chamber cover disposed over the central chamber.

11. The linear motor armature of claim 9, wherein said sealed metal case comprises cast aluminum.

12. The linear motor armature of claim 9, wherein said electrically nonconductive fluid comprises oil.

* * * * *